United States Patent
Yu et al.

(10) Patent No.: US 11,966,877 B2
(45) Date of Patent: Apr. 23, 2024

(54) ORDER PROCESSING METHOD, APPARATUS, DEVICE, SYSTEM, AND STORAGE MEDIUM

(71) Applicant: HAI ROBOTICS CO., LTD., Shenzhen (CN)

(72) Inventors: Runfang Yu, Shenzhen (CN); Xin Ai, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 17/580,390

(22) Filed: Jan. 20, 2022

(65) Prior Publication Data

US 2022/0147928 A1 May 12, 2022

Related U.S. Application Data

(63) Continuation of application No. 17/206,923, filed on Mar. 19, 2021, now Pat. No. 11,276,036.

(30) Foreign Application Priority Data

Sep. 17, 2020 (CN) .......................... 202010976537.7

(51) Int. Cl.
*G06Q 10/0875* (2023.01)
(52) U.S. Cl.
CPC ................ *G06Q 10/0875* (2013.01)
(58) Field of Classification Search
CPC ........ G06Q 10/08; G06Q 10/00; G06Q 30/00; G06F 17/30
USPC ........ 705/7.25, 7.37, 7.31, 7.26, 28, 29, 330
See application file for complete search history.

(56) References Cited

U.S. PATENT DOCUMENTS

| | | | | |
|---|---|---|---|---|
| 7,295,990 | B1* | 11/2007 | Braumoeller | G06Q 10/063 705/28 |
| 7,747,543 | B1* | 6/2010 | Braumoeller | G06Q 10/083 705/330 |
| 2003/0171962 | A1* | 9/2003 | Hirth | G06Q 10/087 705/7.25 |
| 2003/0172007 | A1* | 9/2003 | Helmolt | G06Q 10/06316 705/28 |

(Continued)

FOREIGN PATENT DOCUMENTS

JP 2020527524 A 9/2020

OTHER PUBLICATIONS

First Office Action of the parallel application JP2021-19183.

*Primary Examiner* — Olusegun Goyea
(74) *Attorney, Agent, or Firm* — J.C. PATENTS

(57) ABSTRACT

The embodiments of the present disclosure provide an order processing method, apparatus, device, system and storage medium, where the method includes: acquiring an original order to be processed; searching for unsorted target orders, where the target orders are obtained by combining a plurality of original orders; decomposing at least part of the searched target orders into original orders; combining the original orders obtained by decomposition and the original order to be processed to regenerate one or more target orders. The order processing method, apparatus, device, system and storage medium provided by the embodiments of the present disclosure can realize dynamic roll-back combining, so that the newly arrived original order is combined with the currently unsorted target orders, and the out-of-warehouse efficiency is effectively improved.

13 Claims, 5 Drawing Sheets

(56) References Cited

U.S. PATENT DOCUMENTS

| | | | |
|---|---|---|---|
| 2011/0029401 A1* | 2/2011 | Granger | G06Q 30/0623 |
| | | | 705/26.7 |
| 2013/0088517 A1* | 4/2013 | McKenna | G06F 16/444 |
| | | | 345/635 |
| 2017/0124511 A1* | 5/2017 | Mueller | H04W 4/029 |
| 2018/0094936 A1* | 4/2018 | Jones | G01C 21/206 |
| 2018/0137215 A1* | 5/2018 | Lee | G06Q 30/0631 |

* cited by examiner

ORDER PROCESSING METHOD, APPARATUS, DEVICE, SYSTEM, AND STORAGE MEDIUM

CROSS-REFERENCE TO RELATED APPLICATION

This application is a continuation of U.S. patent application Ser. No. 17/206,923, filed on Mar. 19, 2021, now allowed, which claims priority to Chinese Patent Application No. 202010976537.7, filed on Sep. 17, 2020. All of the aforementioned patent applications are hereby incorporated by reference in their entireties.

TECHNICAL FIELD

The present disclosure relates to the field of intelligent warehousing, in particular, to an order processing method, apparatus, device, system and storage medium.

BACKGROUND

With the continuous development of the intelligent warehousing technology, the social demand for warehousing is also increasing. How to ensure the rapid out-of-warehouse of goods has become a hot issue.

In the current intelligent warehousing system, users can send orders containing goods information to the system, and the system can send the orders to the console provided with a plurality of slots, where each slot can be used to place goods corresponding to one order, so that robots and pickers can process the goods based on the slots. When the order picking corresponding to a certain slot is completed, the slot is free, and the system can send another order to the slot. The process is repeated until all orders are processed.

Because of the limitation of the number of slots of the console, the number of orders each console can simultaneously process is limited, which results in low out-of-warehouse efficiency.

SUMMARY

Embodiments of the present disclosure provide an order processing method, apparatus, device, system and storage medium to solve the technical problem of low out-of-warehouse efficiency.

In a first aspect, an embodiment of the present disclosure provides an order processing method including:
acquiring original orders to be processed;
searching for unsorted target orders, where the target orders are obtained by combining a plurality of original orders;
decomposing at least part of the searched target orders into original orders; and
combining the original orders obtained by decomposition and the original orders to be processed to regenerate one or more target orders.

In a possible design, the unsorted target orders are target orders that have not been sent to a console, or target orders that have been sent to a console but has not occupied slots of the console.

In a possible design, the number of the original orders to be processed is one or more; decomposing at least part of the searched target orders into original orders, including:
determining the target orders as target orders to be rolled back if an original order corresponding to any target order among the searched target orders and at least one original order to be processed satisfy an order-combining constraint; and decomposing the target orders to be rolled back into original orders.

In a possible design, the order-combining constraint includes: each original order has a same priority and/or type.

In a possible design, the method further includes:
determining the priority of the original orders according to an out-of-warehouse deadline of the original orders; and/or, determining the type of the original orders according to the number of goods corresponding to the original orders.

In a possible design, combining the original orders obtained by decomposition and the original orders to be processed to regenerate one or more target orders, including:
dividing the original orders obtained by decomposition and the original orders to be processed into a plurality of groups, where each original order in each group satisfies an order-combining constraint; and
combining, based on a circumstance that each group of original orders satisfies a target order constraint, the original orders in the groups to generate one or more target orders.

In a possible design, the target order constraint includes: a total number of goods corresponding to any target order is not greater than a preset number threshold, and/or a total space occupation of goods is not greater than a preset space threshold.

In a possible design, combining, based on a circumstance that each group of original orders satisfies a target order constraint, the original orders in the groups to generate one or more target orders, including:
determining, based on the circumstance that each group of original orders satisfies the target order constraint, one or more target orders to be finally generated by evaluating a total number of target orders obtained after order-combining and/or a sum of numbers of goods types of the target orders obtained.

In a possible design, the method further includes:
determining, for each target order in the target orders obtained after order-combining, the number of goods types of the target order according to the goods types corresponding to original orders contained in the target order;
directly adding numbers of goods types of the obtained target orders together to obtain a sum of the numbers of the goods types.

In a possible design, the determining, based on a circumstance that each group of original orders satisfies a target order constraint, one or more target orders to be finally generated by evaluating a total number of target orders obtained after order-combining and/or a sum of numbers of goods types of the target orders obtained, includes:
determining all possible order-combining schemes based on the circumstance that each group of original orders satisfies the target order constraint, where the order-combining schemes include combining the original orders in the groups to obtain one or more target orders;
calculating, for any order-combining scheme, a score corresponding to a total number of the target orders obtained and/or a score corresponding to a sum of numbers of goods types of the target orders obtained;
determining, according to the score obtained by the calculating, an order-combining scheme that is finally selected.

In a possible design, the method further includes:
combining the original orders to be processed to generate one or more target orders if the unsorted target orders do not exist or the unsorted target orders have no target order to be rolled back.

In a possible design, the method further includes:
selecting, for each empty slot in the console, a target order from the unsorted target orders for distribution to the empty slot if there is at least one empty slot in the console.

In a second aspect, an embodiment of the present disclosure provides an order processing apparatus, including:
an acquiring module, configured to acquire original orders to be processed;
a searching module, configured to search for unsorted target orders, where the target orders are obtained by combining a plurality of original orders;
a decomposing module, configured to decompose at least part of the searched target orders into original orders;
an order combining module, configured to combine the original orders obtained by decomposition and the original orders to be processed to regenerate one or more target orders.

In a third aspect, an embodiment of the present disclosure provides a control device including:
at least one processor; and
a memory communicatively connected to the at least one processor;
where the memory stores instructions executable by the at least one processor, and the instructions are executed by the at least one processor to enable the control device to execute the method in any one of the first aspect.

In a fourth aspect, an embodiment of the present disclosure provides a warehousing system which includes the control device as described in the third aspect, a console and a robot;
where the console is used to acquire a target order sent by the control device and display the target order to a picker;
the robot is used to acquire a picking task sent by the control device according to the target order, and take out goods corresponding to the target order from a warehouse according to the picking task, so that the picker puts the corresponding goods into a slot of the console.

In a fifth aspect, an embodiment of the present disclosure provides a computer-readable storage medium having stored therein computer-executable instructions which, when executed by a processor, implements the method as described in any one of the first aspect.

The order processing method, apparatus, device, system and storage medium provided by the embodiments of the present disclosure can acquire an original order to be processed, and search for unsorted target orders, where the target orders are obtained by combining a plurality of original orders, and decompose at least part of the searched target orders into original orders, and combine the original orders obtained by decomposition and the original order to be processed to regenerate one or more target orders, by which dynamic roll-back combining is realized, so that the newly arrived original order is combined with the currently unsorted target orders, and the out-of-warehouse efficiency is improved.

BRIEF DESCRIPTION OF DRAWINGS

In order to explain the technical schemes in the embodiments of the present disclosure or in the prior art more clearly, the following will briefly introduce the drawings that need to be used in the description of the embodiments or the prior art. Obviously, the drawings in the following description are some embodiments of the present disclosure, and for those of ordinary skill in the art, other drawings can be obtained according to these drawings without paying creative labor.

DETAILED DESCRIPTION

In order to make the purpose, the technical scheme and the advantage of the embodiments of the present disclosure clearer, the following will describe the technical scheme in the embodiments of the present disclosure clearly and comprehensively with reference to the drawings in the embodiments of the present disclosure. Obviously, the described embodiments are part of the embodiments of the present disclosure, not all of them. Based on the embodiments in the present disclosure, all other embodiments obtained by ordinary technicians in this field without creative labor fall into the protection scope of the present disclosure.

Figure 1:
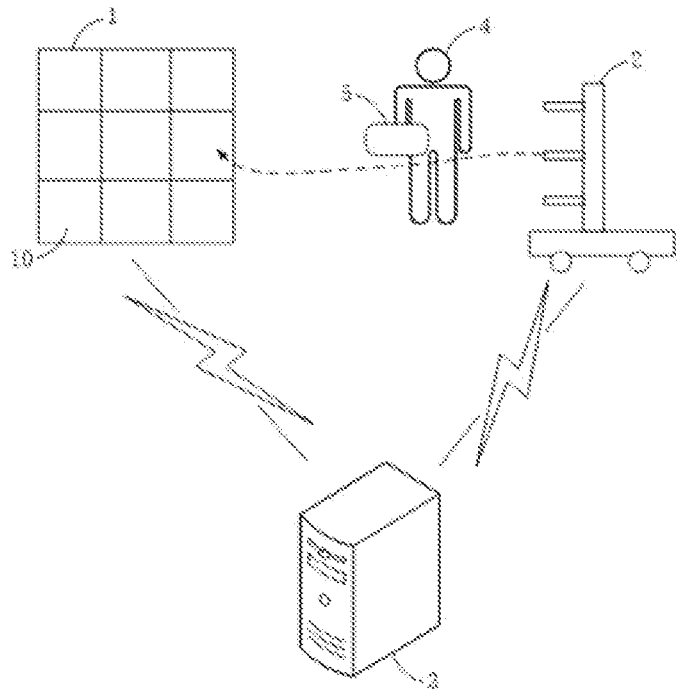
FIG. 1 is a schematic diagram of an application scenario provided by an embodiment of the present disclosure.

FIG. 1 is a schematic diagram of an application scenario provided by an embodiment of the present disclosure. As shown in FIG. 1, in order to improve the out-of-warehouse efficiency, a console 1 and a robot 2 can be installed in a warehousing system. There may be one or more consoles 1 and one or more robots 2. Each console 1 may include a plurality of slots 10 for placing goods 5. The robot 2 may be provided with a basket or the like, and can move with the goods 5.

Both the robot 2 and the console 1 can communicate with a control device 3, which can be a server or a terminal device. After receiving an order issued by a user, the control device 3 can distribute the order to a slot 10 of the console 1, and inform the robot 2 to transport the goods 5 required for the order from the warehouse shelf to the vicinity of the console 1, and a picker 4 will place the goods 5 transported by the robot 2 in the slot 10 of the console 1. The dotted line in the figure indicates that the goods 5 are moved from the robot 2 to the corresponding slot 10. After the goods 5 in the slot 10 are collected, the goods 5 can be sent for secondary sorting or packing. When a certain slot 10 is empty, the control device 3 can assign another order to this slot 10. The process is repeated until all orders are distributed and the picking is completed.

Because of the limited number of slots 10 in the console 1, when each order issued by the user occupies one slot 10, the number of orders that can be processed simultaneously by the console 1 is not greater than the number of slots 10 in the console 1. Then, the types of goods 5 that robots 2 can carry are limited. When there are enough robots 2, some robots 2 will definitely be idle so that the robots 2 will not be fully used, ultimately leading to the low overall out-of-warehouse efficiency of the system.

In order to solve this problem, according to the embodiments of the present disclosure, a plurality of acquired original orders can be combined to obtain one or more target orders, and the target orders are sent to the console 1 for processing, and each slot 10 of the console 1 can process one target order, thereby processing the plurality of original orders in batches and improving the out-of-warehouse efficiency.

Furthermore, after a new batch of original orders is acquired, target orders that have not been processed by the console 1 can be searched. At least part of the searched target orders may be broken up and combined with the newly acquired original orders, and one or more target orders are regenerated, so that the new batch of original orders that has been acquired can be combined with the previous target orders, thereby further improving the out-of-warehouse efficiency.

Some embodiments of the present disclosure will be described in detail with reference to the accompanying drawings. The following embodiments and the features therein can be combined with each other under a circumstance that there is no conflict between the embodiments.

Figure 2:
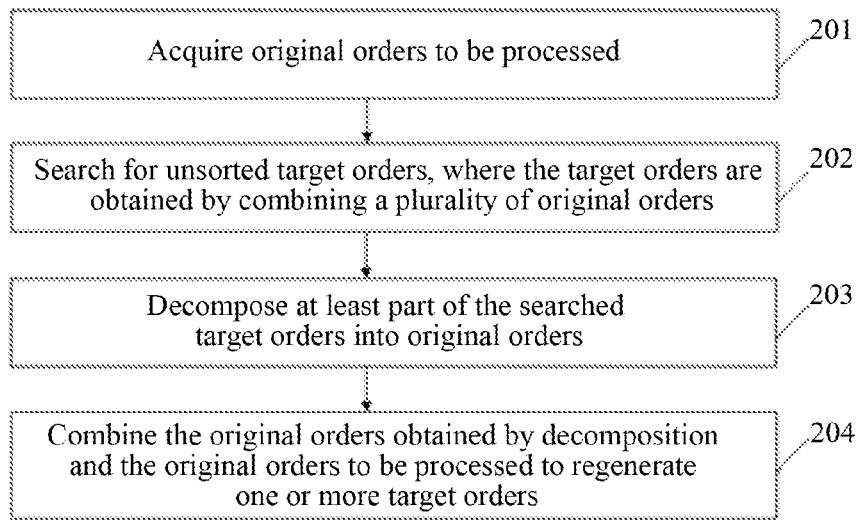
FIG. 2 is a flow chart of an order processing method provided by an embodiment of the present disclosure.

FIG. 2 is a flow chart of an order processing method provided by an embodiment of the present disclosure. The execution subject of the method in the present embodiment may be a control device. As shown in FIG. 2, the order processing method in the present embodiment may include:

Step 201, acquiring original orders to be processed.

The original orders to be processed can be sent by the user or automatically generated by the control device, for example, the original orders for out-of-warehouse are generated at regular intervals. The number of the original orders to be processed can be one or more.

Step 202, searching for unsorted target orders, where the target orders are obtained by combining a plurality of original orders.

The target orders in this step can be generated before Step 201. The target orders are orders obtained by combining a plurality of original orders. In the embodiments of the present disclosure, order-combining may refer to combination of a plurality of original orders according to a certain strategy to obtain one or more target orders. Generally, each target order includes multiple original orders, but in some extreme cases, it is not excluded that some target order only includes one original order.

After obtaining one or more target orders, the one or more target orders can be sent to the console for processing, where each slot of the console can be assigned one target order. When a new batch of original orders to be processed is obtained in Step 201, target orders that have not been sorted can be searched. The unsorted target orders may be target orders that have not occupied the slot of the console.

In an optional implementation, the control device sends the target orders to the console when there are empty slots in the console. After the target orders occupy the empty slots, the robot and the picker process the target orders and cooperate to place the goods required for the target orders in the slots. In this condition, the unsorted target orders may be target orders that have not been sent to the console. This scheme has simple logic and is less error-prone. For convenience of description, illustration is made by taking this processing method as an example in the embodiments of the present disclosure.

In other optional implementations, after a target order is generated, the control device can send the target order to the console. If there is no empty slot in the console at present, the target order is cached in the console, and then allocated to the empty slot when there is one. In this condition, the unsorted target orders may be target orders that have been sent to the console but have not occupied the slots in the console, and the console can feed back to the control device whether the target orders have occupied the slots at present. This scheme enables the console to timely acquire a target order to be processed and schedule to process the target order when there is an empty slot, thus improving the efficiency of slot distribution for target orders where there are empty slots.

Step 203, decomposing at least part of the searched target orders into original orders.

Optionally, target orders that satisfy certain conditions can be selected from the searched target orders and decomposed into original orders. The mentioned conditions are not limited.

Optionally, the selected target orders can be the target orders in which the original orders contained can be combined with the original orders to be processed, so that the original orders obtained after decomposition can be combined with the original orders to be processed. For the target orders that do not contain any original order that can be combined with the original orders to be processed, the decomposition operation may not be performed.

Step 204, combining the original orders obtained by decomposition and the original orders to be processed to regenerate one or more target orders.

Specifically, the original orders obtained by decomposition and the original orders to be processed, as a new batch of original orders to be combined, can be combined according to the previous target order generation strategy, and the target orders are regenerated to replace the previously decomposed target orders. The number of regenerated target orders can be the same as or different from the number of decomposed target orders.

For example, it is assumed that 100 original orders are acquired at the initial stage, and 15 target orders are obtained by processing these original orders. The console includes 9 slots, and each slot can be used to process 1 target order, then 9 target orders can be selected from them and sent to the console.

During the processing, the console may receive a new batch of original orders sent by the user. It is assumed that there are 20 new original orders, while there are currently 15−9=6 unsorted target orders. Among the 6 target orders, possibly, only 2 of them can be combined with the batch of newly arrived original orders, and then the 2 target orders can be decomposed to original orders. It is assumed that 10 original orders are obtained by decomposition, and then the 10 original orders obtained by decomposition are combined with 20 newly arrived original orders to obtain new target orders. The number of the new target orders may be 2 or more, but it is generally not less than the number of the decomposed target orders.

It is assumed that the number of new target orders obtained is five. These five newly obtained target orders together with the four target orders that were not sorted previously but have not been decomposed (nine target orders in total) can be used as target orders that haven't been sorted currently.

Optionally, when there is at least one empty slot in the console, for each empty slot in the console, one target order can be selected from the unsorted target orders and be distributed to the empty slot. After the target order is distributed to the empty slot, it occupies the slot, and the slot enters a non-empty state. The robot and the picker place the goods required for the target order in the empty slot to complete the sorting of the target order.

When one target order is sent to the console for processing, the unsorted target orders become 8. When a new batch of original orders arrives again, the above steps can be repeated according to the current 8 unsorted target orders and the new batch of original orders, thereby processing the orders efficiently and orderly.

After the goods required for the target order are collected in the slot, the goods can be taken out and sent for secondary sorting, through which goods required for each original order can be picked out from the collected goods, and then the goods can be sent for packaging and out-of-warehouse.

The order processing method provided by the embodiment can acquire an original order to be processed, and search for unsorted target orders, where the target orders are obtained by combining a plurality of original orders, and decompose at least part of the searched target orders into original orders, and combine the original orders obtained by decomposition and the original order to be processed to regenerate one or more target orders, by which dynamic roll-back combining is realized, so that the newly arrived original order can be combined with the currently unsorted target orders, and the out-of-warehouse efficiency is improved.

Figure 3:
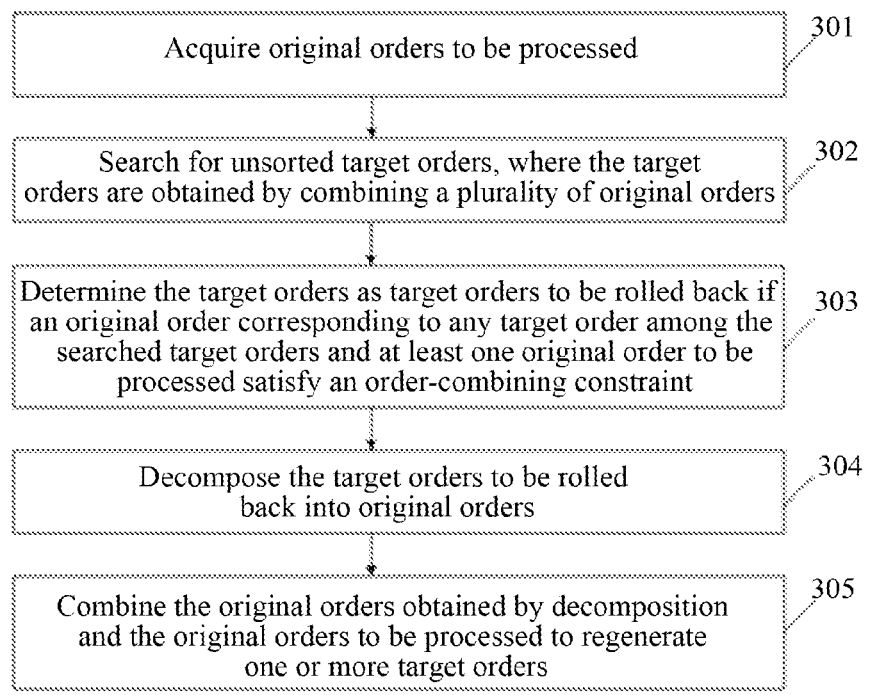
FIG. 3 is a flow chart of another order processing method provided by an embodiment of the present disclosure.

FIG. 3 is a flow chart of another order processing method provided by an embodiment of the present disclosure. On the basis of technical scheme provided by the previous embodiment, the present embodiment realizes the order-combining through some constraints. As shown in FIG. 3, the method includes:

Step 301, acquiring original orders to be processed.

Step 302, searching for unsorted target orders, where the target orders are obtained by combining a plurality of original orders.

In the present embodiment, reference may be made to the aforementioned embodiments for a specific implementation of Step 301 to Step 302, and details will not be described here again.

Step 303, determining the target orders as target orders to be rolled back if an original order corresponding to any target order among the searched target orders and at least one original order to be processed satisfy an order-combining constraint.

Specifically, it can be provided that any number of original orders can be combined only when an order-combining constraint is satisfied. Multiple original orders that do not satisfy the order-combining constraint cannot appear in the same target order.

The order-combining constraint may include: each original order has a same priority and/or type. For example, if three original orders have the same priority, then these three original orders satisfy the order-combining constraint; if one of the three original orders has a high priority and the other two have a low priority, then the one original order with the high priority and the other two cannot be combined together because they do not satisfy the order-combining constraint, but the two original orders with the low priority can be combined because they satisfy the order-combining constraint.

Optionally, the priority of the original orders may be determined according to an out-of-warehouse deadline of the original orders; and/or, the type of the original orders can be determined according to the number of goods corresponding to the original orders.

The original orders with the same or similar out-of-warehouse deadline can have the same priority. The earlier the out-of-warehouse deadline is, the higher the corresponding priority is. Thus the original orders approaching the out-of-warehouse deadline can be processed in priority to avoid pending orders.

The type of the original orders can include multi-product orders and single-product orders, where multi-product orders mean that orders need more than one piece of goods, and single-product orders mean that orders need only one piece of goods. The efficiency of secondary sorting can be effectively improved by combining the single-product orders and the multi-product orders separately.

Further, it is also possible to only combine the multi-product orders. For the single-product orders, when the robot picks up the goods, the picker can directly take away the goods needed for the single-product orders and send them for package, so the single-product orders may not occupy the slots and there is no need for order-combining, thus improving the processing efficiency of the single-product orders.

In addition, the priority and type of the original orders can be determined by other means. For example, the priority can be set by the user or determined according to the importance of the goods in the orders; for another example, besides the multi-product orders and the single-product orders, the type can also include fragile goods orders and non-fragile goods orders. The order-combining constraint is not merely limited to the priority and type, but can be extended to other constraints according to actual needs. For example, orders may have different out-of-warehouse sites, and the order-combining constraint can be set to include the same out-of-warehouse site to further improve the out-of-warehouse efficiency.

The above order-combining constraint can be considered every time a combined target order is obtained. Therefore, multiple original orders in each target order should satisfy the order-combining constraint. In this step, when determining whether original orders corresponding to any target order and at least one original order to be processed satisfy the order-combining constraint, a determination may be made only with regard to whether one original order in the target order and one or several original orders to be processed satisfy the order-combining constraint, if yes, it can be determined that all original orders in the target order and the described one or several original orders satisfy the order-combining constraint. If the order-combining constraint is satisfied, the target order is determined to be a target order to be rolled back.

For example, there are currently 2 unsorted target orders and 3 newly acquired original orders to be processed, namely a, b and c, in which a and b satisfy the order-combining constraint, while neither of c and a or b satisfy the order-combining constraint.

If any original order in the first target order and a, b satisfy the order-combining constraint, the first target order is a target order to be rolled back. If any original order in the second target order and c satisfy the order-combining constraint, the second target order is also a target order to be rolled back.

Step 304, decomposing the target orders to be rolled back into original orders.

In the present embodiment, through Steps 303-304, the decomposition of at least part of the searched target orders into original orders can be realized.

Step 305, combining the original orders obtained by decomposition and the original orders to be processed to regenerate one or more target orders.

In order-combining, the original orders that satisfy the order-combining constraint can be put together for combining.

Figure 4:
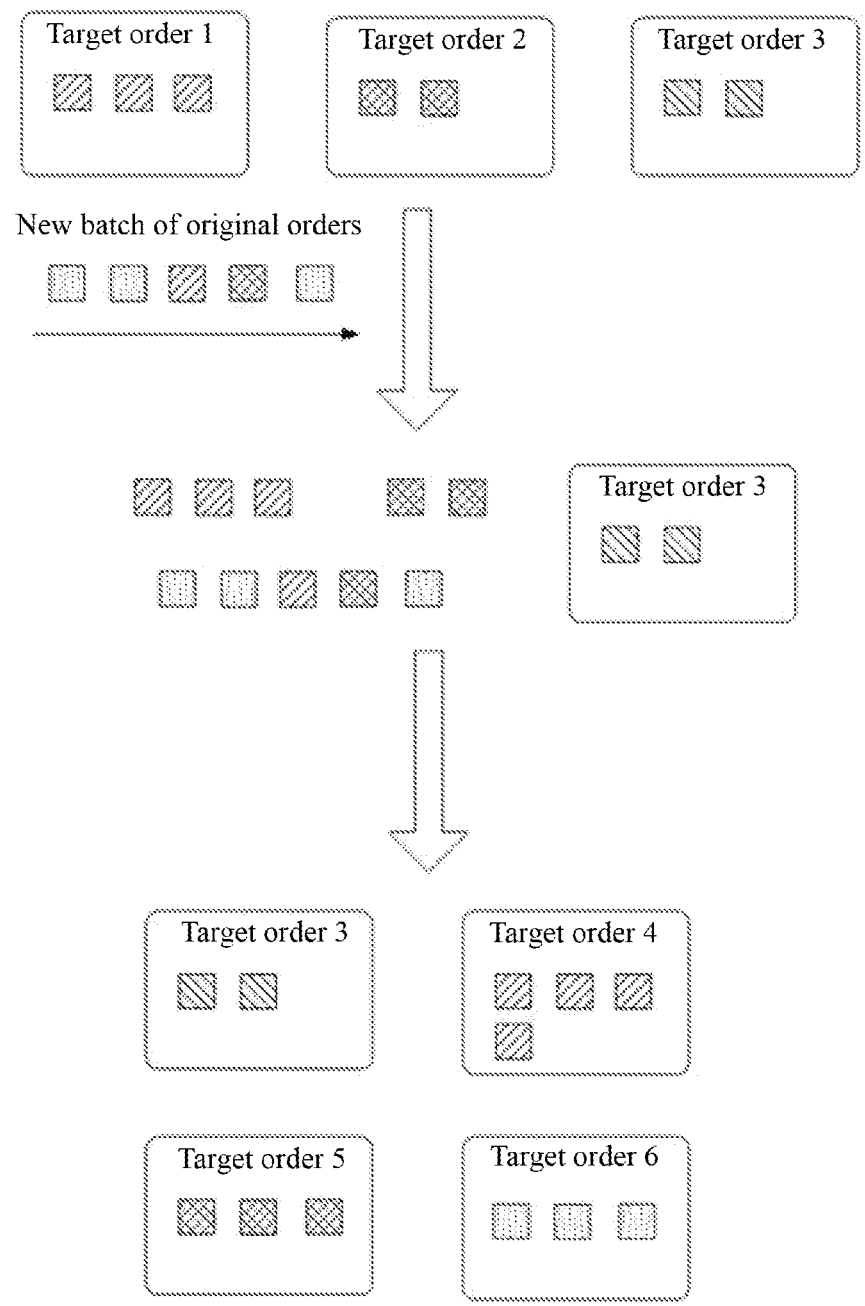
FIG. 4 is a schematic diagram showing principles of order combining provided by an embodiment of the present disclosure.

FIG. 4 is a schematic diagram showing principles of order-combining provided by an embodiment of the present disclosure. As shown in FIG. 4, there are three unsorted target orders, target order 1 includes three original orders, and target orders 2 and 3 each contain two original orders. Small squares in the target orders represent the original orders contained in the target orders, and the original orders with the same shadow pattern are original orders that satisfy the order-combining constraint. All original orders in one target order should satisfy the order-combining constraint.

It is assumed that a batch of original orders is newly acquired, with a total of five, of which one can be combined with the original orders in target order 1, one can be combined with the original orders in target order 2, and the other three cannot be combined with the original orders in any of the current target orders.

Then, target order 1 and target order 2 can be decomposed into five original orders before combining, and the decomposed five original orders and the new five original orders can be combined again to obtain target order 4, target order 5 and target order 6, which together with the previous target order 3 will be used as the currently unsorted target orders, from which the target orders will be selected and sent to the console for processing if there are empty slots in the console.

Without the above-mentioned dynamic roll-back combining mechanism, when five original orders are newly acquired, only the five original orders can be combined to obtain three target orders, in this case the number of unsorted target orders reaches six. With the scheme provided by the embodiments of the present disclosure, the newly acquired original orders and the original orders which have been combined previously can be combined again to obtain four target orders, which effectively reduces the slot occupation and improves the out-of-warehouse efficiency.

Optionally, the combining the original orders obtained by decomposition and the original orders to be processed to regenerate one or more target orders may include: dividing the original orders obtained by decomposition and the original orders to be processed into multiple groups, where each original order in each group satisfies the order-combining constraint; and combining, based on a circumstance that each group of original orders satisfies a target order constraint, the original orders in the groups to generate one or more target orders.

Specifically, the original orders obtained by decomposition and the original orders to be processed can be put into an original order pool, and then the original orders in the original order pool are divided into multiple groups. For each group, all the original orders in the group satisfy the order-combining constraint.

Then, for each group, all the original orders in the groups can be combined. When combining, it is necessary to satisfy the order-combining constraint and then one or more target orders are formed after combining.

Optionally, the target order constraint may include: a total number of goods corresponding to any target order is not greater than a preset number threshold, and/or a total space occupation of goods is not greater than a preset space threshold. Where the preset number threshold can be the number of goods that can be accommodated in one slot of the console, and the preset space threshold can be the space accommodation of one slot, thus ensuring that the generated target order can adapt to the slot and ensuring that the order is normally processed.

According to the order processing method provided by the embodiments of the present disclosure, it can be determined whether an original order corresponding to a target order among the searched target orders and at least one original order to be processed satisfy the order-combining constraint, and then it is determined whether the target orders need to be decomposed into original orders and participate in the subsequent order-combining. The target orders able to be combined with the original orders to be processed can be decomposed and processed, and it is not necessary to decompose all the target orders, which improves the order processing efficiency effectively.

In addition, when a new batch of original orders to be processed is obtained, if the unsorted target orders do not exist or the unsorted target orders have no target order to be rolled back, the original orders to be processed may be combined to generate one or more target orders, so that the newly obtained original orders are combined autonomously under a circumstance that the newly obtained batch of original orders cannot be combined with the previous original orders, ensuring that the newly obtained original orders are processed in time.

On the basis of the technical schemes provided by the above embodiments, an embodiment of the present disclosure also provides an optional order-combining strategy. The combining, based on a circumstance that each group of original orders satisfies a target order constraint, the original orders in the groups to generate one or more target orders may include: determining, based on the circumstance that each group of original orders satisfies the target order constraint, one or more target orders to be finally generated by evaluating a total number of target orders obtained after order-combining and/or a sum of numbers of goods types of the target orders obtained.

Specifically, the goal of combining original orders can be as follows: the fewer the combined target orders, the better, because each target order occupies a slot, and the fewer the combined target orders, the fewer the slots required, it means that the console can handle more demands at the same time; the smaller the sum of the numbers of types of goods totally required for the combined target orders, the better, because if the sum of the numbers of types of goods is smaller, it means the fewer the types of goods that the robot needs to move, which can reduce the re-pick rate of the types of goods.

In the embodiments of the present disclosure, the sum of the numbers of the goods types of the obtained target orders may result from directly adding the numbers of goods types of the target orders together. The goods can be represented by SKU (Stock Keeping Unit), which is the unit of inventory in and out measurement, and the goods type can refer to the SKU type, and different SKUs correspond to different types.

Specifically, for each target order in the target orders obtained after order-combining, the number of goods types of the target order is determined according to the goods types corresponding to original orders contained in the target order; and the numbers of goods types of the target orders obtained are directly added together to obtain the sum of the numbers of the goods types.

For example, target order 1 contains two original orders, of which one contains goods A and B and the other contains goods B and C, therefore, the goods types contained in target order 1 include A, B and C, so the number of goods types in target order 1 is three.

The number of goods types of target order 2 is also three, including goods A, C and D. Then the sum of the numbers of the goods types of target order 1 and target order 2 is 3+3=6. However, before order-combining, the goods types of all the original orders include A, B, C and D, and the total number of goods types is 4. Thus, the sum of the numbers of goods types of the target orders is not necessarily equal to the number of goods types of all the original orders before the order-combining.

In practical use, the robot moves the goods according to the target orders, and even though different target orders have a same goods type therebetween, the total number of goods types is also considered to be increased. Through this evaluation method, the sum of the numbers of the goods types of the target orders can be made as small as possible, and the goods of the same type are often stored together in the warehouse, so the smaller the sum of the numbers of goods types, the less overall time it takes for the robot to pick up the goods.

Optionally, the determining, based on a circumstance that each group of original orders satisfies a target order constraint, one or more target orders to be finally generated by evaluating the total number of target orders obtained after order-combining and/or the sum of the numbers of goods types of the target orders obtained may include: determining all possible order-combining schemes based on the circumstance that each group of original orders satisfies the target order constraint, where the order-combining schemes include combining the original orders in the groups to obtain on or more target orders; calculating, for any order-combining scheme, a score corresponding to a total number of target orders obtained and/or a score corresponding to a sum of numbers of goods types of the target orders obtained; determining, according to the score obtained by the calculating, an order-combining scheme that is finally selected.

Specifically, for any group of original orders, all possible order-combining schemes can be found based on the circumstance that this group of original orders satisfies the target order constraint, and then an optimal solution is selected from all the possible order-combining schemes by means of scoring.

In each order-combining scheme, the less the total number of target orders is, the higher the corresponding score is, and the less the sum of the numbers of the goods types of the target orders is, the higher the corresponding score is. The optimal solution can be selected only according to the score corresponding to the total number, or only according to the score corresponding to the sum of the numbers of goods types. Or, the score corresponding to the total number and the score corresponding to the sum of the numbers of the goods types can be performed with a weighted sum to obtain the overall score, and the order-combining scheme with highest overall score can be selected as the order-combining scheme that is finally selected, according to which the optimal solution can be accurately selected from multiple order-combining schemes and the out-of-warehouse effect can be ensured.

In addition, the order-combining also can be realized through other order-combining strategies. For example, the target order to which each original order is attributing can be determined according to the method of sequential allocation.

Specifically, the first original order is attributing to the first target order, and then it is determined whether the second original order and the first original order contain the same goods type. If yes, the second original order is attributing to the first target order, otherwise, a new target order is added, and the second original order is attributing to the newly added target order, etc., until all orders are processed. Of course, during the processing, the target order constraint and the like can also be considered.

The above provides the order-combining strategy when a new original order is obtained, optionally, when the original order is obtained for the first time, i.e., there is no target order previously, similarly, the order-combining operation can also be performed for the original order obtained for the first time.

Figure 5:
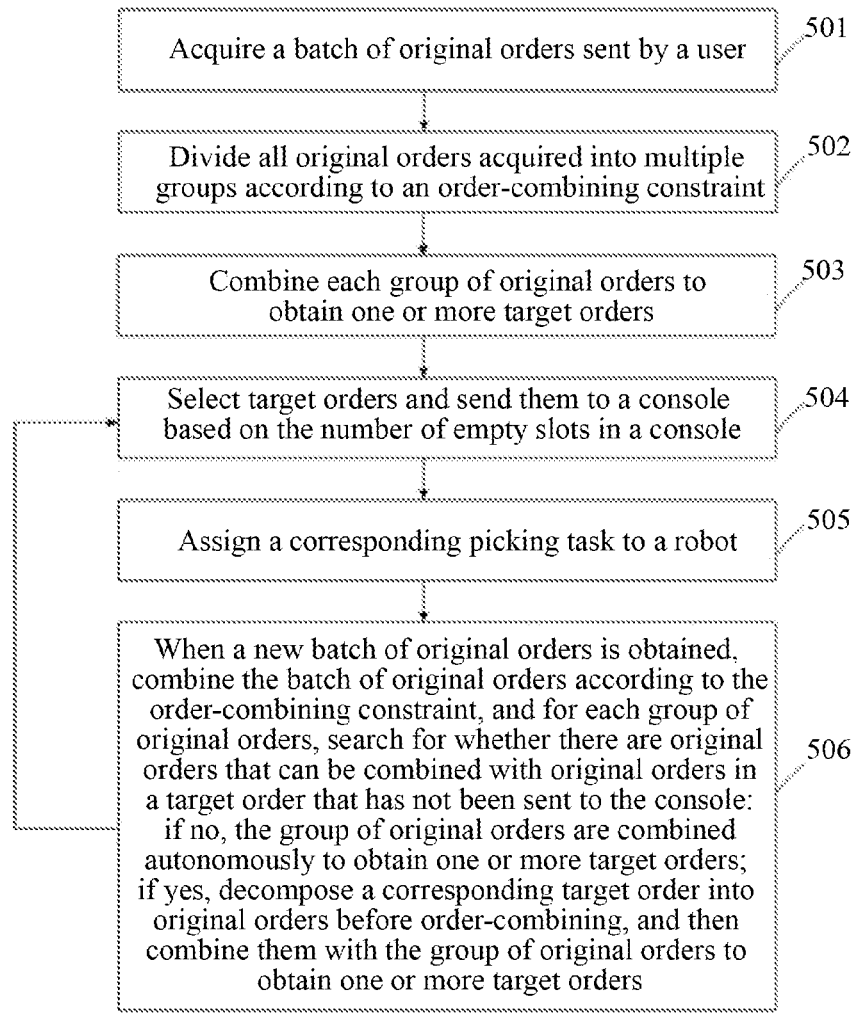
FIG. 5 is a flow chart of yet another order processing method provided by an embodiment of the present disclosure.

FIG. 5 is a flow chart of yet another order processing method provided by an embodiment of the present disclosure. The embodiment provides a procedure starting to process from the first batch of original orders obtained on the basis of technical schemes provided by the above-mentioned embodiments. As shown in FIG. 5, the order processing method may include:

Step 501, acquiring a batch of original orders sent by a user.

Step 502, dividing all original orders acquired into multiple groups according to an order-combining constraint.

For example, only original orders with the same priority and/or the same type can be divided into the same group.

Step 503, combining each group of original orders to obtain one or more target orders.

The order-combining shall satisfy a target order constraint, for example the number of goods of the combined target order(s) must be less than a certain threshold. With the given target order constraint, the goal of order-combining can be: the smaller the total number of the target orders obtained after order-combining is, the better; and the smaller the sum of the numbers of the goods types of the target orders obtained is, the better.

Step 504, selecting target orders and sending them to a console based on the number of empty slots in the console.

The selection strategy is not limited. Optionally, a target order with relatively high priority can be sent to the console first.

Step 505, assigning a corresponding picking task to a robot.

The picking task may include information of goods contained in the target order sent to the console, such as goods identifier, storage position and so on. After acquiring the picking task, the robot may take the goods out of the warehouse shelf and send it to the corresponding console, and the picking is completed by a picker.

Step 506, when a new batch of original orders is obtained, grouping the batch of original orders according to the order-combining constraint, and for each group of original orders, searching for whether there are original orders that can be combined with original orders in a target order that has not been sent to the console: if no, the group of original orders are combined autonomously to obtain one or more target orders; if yes, decomposing the corresponding target order into original orders before order-combining, and then combining them with the group of original orders to obtain one or more target orders. Then, return to Step 504.

The specific implementation principle of the respective steps of the embodiment can be referred to the previously mentioned embodiments and will not be repeated here.

According to the order processing method provided by the present embodiment, when a first batch of original orders is obtained, the original orders can be combined to obtain one or more target orders; every time when a new batch of original orders is subsequently obtained, if there is a target order that satisfies requirements, the target order can be decomposed, and the decomposed original orders and the new batch of original orders can be combined; and if there is no target order that satisfies the requirements, then the new batch of original orders will be combined autonomously; for the order-combining in no matter which case, a similar method can be used, so that in the process of continuously obtaining original orders, the generated target orders will always have a consistent principle, and the goods out-of-warehouse process can be carried out smoothly and orderly.

Figure 6:
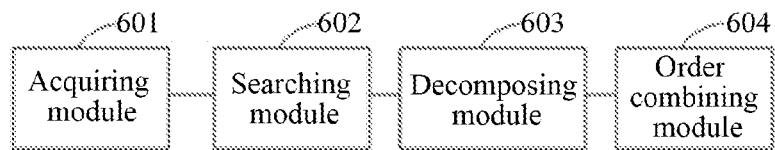
FIG. 6 is a structural schematic diagram of an order processing apparatus provided by an embodiment of the present disclosure.

FIG. 6 is a structural schematic diagram of an order processing apparatus provided by an embodiment of the present disclosure. As shown in FIG. 6, the apparatus may include:

an acquiring module 601, configured to acquire original orders to be processed;

a searching module 602, configured to search for unsorted target orders, where the target orders are obtained by combining a plurality of original orders;

a decomposing module 603, configured to decompose at least part of the searched target orders into original orders;

an order combining module 604, configured to combine the original orders obtained by decomposition and the original orders to be processed to regenerate one or more target orders.

In an optional embodiment, the unsorted target orders are target orders that have not been sent to a console, or target orders that have been sent to a console but have not occupied slots of the console.

In an optional embodiment, the number of the original orders to be processed is one or more; the searching module 602 is specifically configured to:

determine the target orders as target orders to be rolled back if an original order corresponding to any target order among the searched target orders and at least one original order to be processed satisfy an order-combining constraint; and decompose the target orders to be rolled back into original orders.

In an optional embodiment, the order-combining constraint includes: each original order having a same priority and/or type.

In an optional embodiment, the searching module 602 is further configured to:

determine the priority of the original orders according to an out-of-warehouse deadline of the original orders; and/or determine the type of the original orders according to the number of goods corresponding to the original orders.

In an optional embodiment, the order combining module 604 is specifically configured to:

divide the original orders obtained by decomposition and the original orders to be processed into a plurality of groups, where each original order in each group satisfies an order-combining constraint; and combine, based on a circumstance that each group of original orders satisfies a target order constraint, the original orders in the groups to generate one or more target orders.

In an optional embodiment, the target order constraint includes: a total number of goods corresponding to any target order being not greater than a preset number threshold, and/or a total space occupation of goods being not greater than a preset space threshold.

In an optional embodiment, the order combining module 604, when combining, based on a circumstance that a target order constraint is satisfied, the original orders in the groups to generate one or more target orders, is specifically configured to:

determine, based on the circumstance that the target order constraint is satisfied, one or more target orders to be finally generated by evaluating a total number of target orders obtained after order-combining and/or a sum of numbers of goods types of the target orders obtained.

In an optional embodiment, the order combining module 604 is further configured to:

determine, for each target order in the target orders obtained after order-combining, the number of goods types of the target order according to the goods types corresponding to original orders contained in the target order; and directly add numbers of goods types of the obtained target orders together to obtain a sum of the numbers of the goods types.

In an optional embodiment, the order combining module 604, when determining, based on a circumstance that a target order constraint is satisfied, one or more target orders to be finally generated by evaluating a total number of target orders obtained after order-combining and/or a sum of numbers of goods types of the target orders obtained, is specifically configured to:

determine all possible order-combining schemes based on the circumstance that the target order constraint is satisfied, where the order-combining schemes include combining the original orders in the groups to obtain one or more target orders;

calculate, for any order-combining scheme, a score corresponding to a total number of the target orders obtained and/or a score corresponding to a sum of numbers of goods types of the target orders obtained; and determine, according to the score obtained by the calculating, an order-combining scheme that is finally selected.

In an optional embodiment, the order combining module 604 is further configured to:

combine the original orders to be processed to generate one or more target orders if the unsorted target orders do not exist or the unsorted target orders have no target order to be rolled back.

In an optional embodiment, the order combining module 604 is further configured to: select, for each empty slot in the console, a target order from the unsorted target orders for distribution to the empty slot if there is at least one empty slot in the console.

The apparatus provided in the present embodiment can be used to implement the technical schemes of the method embodiments shown in FIG. 1-FIG. 5, and its implementation principle and technical effect are similar thereto, so details will not be described here again.

Figure 7:
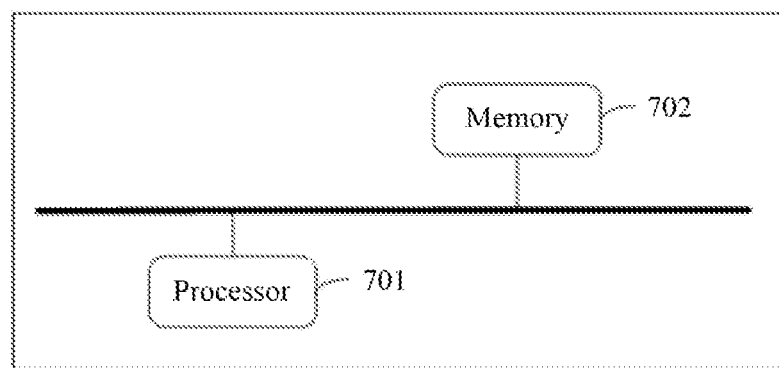
FIG. 7 is a structural schematic diagram of a control device provided by an embodiment of the present disclosure.

FIG. 7 is a structural schematic diagram of a control device provided by an embodiment of the present disclosure. As shown in FIG. 7, the control device of the present embodiment may include:

at least one processor 701; and a memory 702 communicatively connected to the at least one processor;

where the memory 702 stores instructions executable by the at least one processor 701, and the instructions are executed by the at least one processor 701 to enable the control device to execute the method in any one of the above-mentioned embodiments.

Optionally, the memory 702 may be independent, or may be integrated with the processor 701.

The implementation principles and technical effects of the control device provided by the present embodiment can be referred to the previously mentioned embodiments, and will not be described here again.

An embodiment of the present disclosure also provides a warehousing system including the control device in any one of the previously mentioned embodiments, a console and a robot.

The console is used to acquire a target order sent by the control device and display the target order to a picker, for example, it may display: orders in slot 1 including 5 pieces of goods A and 10 pieces of goods B.

The robot is used to acquire a picking task sent by the control device according to the target order, and take out goods corresponding to the target order from a warehouse according to the picking task, so that the picker puts the corresponding goods into a slot of the console.

In the warehousing system provided by the embodiments of the present disclosure, the specific working principles, processes and beneficial effects of the control device, the console and the robot can be referred to the aforementioned embodiments, and will not be described here again.

An embodiment of the present disclosure also provides a computer-readable storage medium, where the computer-readable storage medium stores computer-executable instructions which, when executed by a processor, implements the method as described in any one of the aforementioned embodiments.

In several embodiments provided in the present disclosure, it should be understood that the disclosed devices and methods can be realized in other ways. For example, the device embodiments described above are only illustrative, for example the division of the mentioned modules is only a logical function division, and there may be another division pattern in actual realization, for example, multiple modules can be combined or integrated into another system, or some features can be ignored or not executed. On the other hand, the coupling or direct coupling or communication connection shown or discussed can be indirect coupling or communication connection through some interfaces, devices or modules, and can be in electrical, mechanical or other forms.

The modules described as separation components may or may not be physically separated, and the components described as modules may or may not be physical units, that is, they may be located in one place or distributed to multiple network units. Some or all of the modules can be selected according to actual needs to achieve the scheme of the present embodiments.

In addition, each functional module in each embodiment of the present disclosure may be integrated into one processing unit, or each module may be physically separated alone, or two or more modules may be integrated into one unit. The units formed by the above modules can be realized in the form of hardware, or in the form of hardware and software functional units.

The integrated module realized in the form of software functional module can be stored in a computer-readable storage medium. The aforementioned software functional module is stored in a storage medium and includes several instructions to enable a computer device (which can be a personal computer, a server, or a network device, etc.) or a processor to execute part of the steps of the method described in the embodiments of the present disclosure.

It should be understood that the processor can be a Central Processing Unit (CPU for short), other general processor, Digital Signal Processor (DSP for short), Application Specific Integrated Circuit (ASIC for short), etc. The general processor can be a micro-processor or any conventional processor. The steps of the method disclosed in connection with the application can be directly embodied as being completed by the hardware processor, or by a combination of hardware and software modules in the processor.

The memory may include a high-speed RAM memory, and may also include a nonvolatile memory NVM, such as at least one disk memory, and may also be an USB flash disk, a mobile hard disk, a read-only memory, a magnetic disk or an optical disk, etc.

The bus can be an Industry Standard Architecture (ISA for short) bus, a Peripheral Component Interconnect (PCI for short) bus or an Extended Industry Standard Architecture (EISA for short) bus, etc. The bus can be divided into an address bus, a data bus, a control bus and so on. For convenience of illustration, the bus in the drawings of the present disclosure is not limited to only one bus or one type of bus.

The above-mentioned storage medium can be realized by any type of volatile or nonvolatile storage device or their combination, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The storage medium can be any available medium that can be accessed by a general or special computer.

An exemplary storage medium is coupled to a processor so that the processor can read information from the storage medium and write information to the storage medium. Of course, the storage medium can also be an integral part of the processor. The processor and the storage medium can be located in an Application Specific Integrated Circuit (ASIC for short). Of course, the processor and the storage medium can also exist in an electronic device or a main control device as discrete components.

Those of ordinary skill in the art can understand that all or part of the steps for implementing the above-mentioned method embodiments can be completed by hardware related to program instructions. The aforementioned program can be stored in a computer-readable storage medium. When the program is executed, the steps including the above method embodiments are executed; and the aforementioned storage media includes an ROM, an RAM, a magnetic disk or an optical disk, etc., which can store program codes.

Finally, it should be noted that the above embodiments are only used to illustrate the technical scheme of the present disclosure, but not to limit it; although the disclosure has been described in detail with reference to the aforementioned embodiments, those of ordinary skill in the art should understand that the technical schemes described in the aforementioned embodiments can still be modified, or some or all of the technical features can be equivalently substituted; however, these modifications or substitutions do not make the essence of the corresponding technical schemes deviate from the scope of the technical schemes of the embodiments of the present disclosure.

What is claimed is:

1. An order processing method, wherein the method is executed by a control device in a warehousing system, the warehousing system further comprises a robot and a console, both the robot and the console are capable of communicating with the control device, and the method comprises:

acquiring a plurality of original orders to be processed;

generating a first target order and attributing a first original order in the plurality of original orders to be processed to the first target order;

determining whether a second original order in the plurality of original orders to be processed and the first original order satisfy an order-combining constraint;

if the second original order and the first original order satisfy the order-combining constraint, attributing the second original order to the first target order;

if the second original order and the first original order do not satisfy the order-combining constraint, generating a second target order, and attributing the second original order to the second target order;

determining whether other original orders in the plurality of original orders to be processed are attributed to any generated target orders one by one according to whether the order-combining constraint is satisfied, and if the other original orders are not attributed to any generated target orders, generating a new target order(s), until all original orders to be processed are attributed to one or more target orders;

wherein attributing all original orders to be processed to one or more target orders comprises: performing, based on a circumstance where a target order constraint is satisfied, order-combining on the original orders to generate one or more target orders;

wherein performing, based on the circumstance where the target order constraint is satisfied, order-combining on the original orders to generate one or more target orders comprises: determining, based on the circumstance where the target order constraint is satisfied, one or more target orders finally generated, by evaluating at least one of a total number of target orders obtained after order-combining and a sum of numbers of goods types of the target orders obtained;

wherein determining, based on the circumstance where the target order constraint is satisfied, one or more target orders finally generated, by evaluating at least one of the total number of target orders obtained after order-combining and the sum of numbers of goods types of the target orders obtained, comprises: determining all possible order-combining schemes, based on the circumstance where the target order constraint is satisfied, wherein the order-combining schemes comprise combining the original orders to obtain one or more target orders; calculating, for any order-combining scheme, at least one of a score corresponding to the total number of the target orders obtained and a score corresponding to the sum of numbers of goods types of the target orders obtained; and determining, according to the score obtained by calculating, an order-combining scheme that is finally selected;

wherein, the method further comprises: when there is at least one empty slot in the console, selecting, for each empty slot, a target order from unsorted target orders, for distribution to the empty slot.

2. The method according to claim 1, wherein the order-combining constraint comprises: each original order has at least one of the same priority and the same type.

3. The method according to claim 2, further comprising at least one of:

determining the priority of the original orders according to an out-of-warehouse deadline of the original orders; and determining the type of the original orders according to the number of goods corresponding to the original orders.

4. The method according to claim 1, wherein the target order constraint comprises at least one of the following:

a total number of goods corresponding to any target order is not greater than a preset number threshold, and a total space occupation of goods is not greater than a preset space threshold.

5. The method according to claim 1, further comprising:

determining, for each target order in the target orders obtained after order-combining, the number of goods types of the target order according to the goods types corresponding to original orders contained in the target order; and directly adding numbers of goods types of the obtained target orders together to obtain a sum of the numbers of the goods types.

6. A control device, wherein the control device is applied in a warehousing system, the warehousing system further comprises a robot and a console, both the robot and the console are capable of communicating with the control device, and the control device comprises:

at least one processor; and a memory communicatively connected to the at least one processor;

wherein the memory stores instructions executable by the at least one processor, and the instructions are executed by the at least one processor to enable the control device to:

acquire a plurality of original orders to be processed;

generate a first target order and attribute a first original order in the plurality of original orders to be processed to the first target order; and determine whether a second original order in the plurality of original orders to be processed and the first original order satisfy order-combining constraint;

if the second original order and the first original order satisfy the order-combining constraint, attribute the second original order to the first target order;

if the second original order and the first original order do not satisfy the order-combining constraint, generate a second target order, and attribute the second original order to the second target order;

determine whether other original orders in the plurality of original orders to be processed are attributed to any generated target orders one by one according to whether the order-combining constraint is satisfied, and if the other original orders are not attributed to any generated target orders, generate a new target order(s), until all original orders to be processed are attributed to one or more target orders;

wherein the control device is enabled to: perform, based on a circumstance where a target order constraint is satisfied, order-combining on the original orders to generate one or more target orders;

wherein the control device is enabled to: based on the circumstance where the target order constraint is satisfied, evaluate at least one of a total number of target orders obtained after order-combining and a sum of numbers of goods types of the target orders obtained, to determine one or more target orders finally generated;

wherein the control device is enabled to: determine all possible order-combining schemes, based on the circumstance where the target order constraint is satisfied, wherein the order-combining schemes comprise combining the original orders to obtain one or more target orders; calculate, for any order-combining scheme, at least one of a score corresponding to the total number of the target orders obtained and a score corresponding to the sum of numbers of goods types of the target orders obtained; and determine, according to the score obtained by calculating, an order-combining scheme that is finally selected;

wherein the control device is enabled further to: when there is at least one empty slot in the console, select, for each empty slot, a target order from unsorted target orders, for distribution to the empty slot.

7. A warehousing system, comprising: a control device, a console and a robot;

wherein the console is configured to acquire a target order sent by the control device and display the target order to a picker; and the robot is configured to acquire a picking task sent by the control device according to the target order, and take out goods corresponding to the target order from a warehouse according to the picking task, so that the picker puts the goods into a slot of the console;

wherein the control device is applied in the warehousing system, both the robot and the console are capable of communicating with the control device, and the control device comprises: at least one processor; and a memory communicatively connected to the at least one processor;

wherein the memory stores instructions executable by the at least one processor, and the instructions are executed by the at least one processor to enable the control device to:

acquire a plurality of original orders to be processed; generate a first target order and attribute a first original order in the plurality of original orders to be processed to the first target order; and determine whether a second original order in the plurality of original orders to be processed and the first original order satisfy order-combining constraint;

if the second original order and the first original order satisfy the order-combining constraint, attribute the second original order to the first target order;

if the second original order and the first original order do not satisfy the order-combining constraint, generate a second target order, and attribute the second original order to the second target order;

determine whether other original orders in the plurality of original orders to be processed are attributed to any generated target orders one by one according to whether the order-combining constraint is satisfied, and if the other original orders are not attributed to any generated target orders, generate a new target order(s), until all original orders to be processed are attributed to one or more target orders;

wherein the control device is enabled to: perform, based on a circumstance where a target order constraint is satisfied, order-combining on the original orders to generate one or more target orders;

wherein the control device is enabled to: based on the circumstance where the target order constraint is satisfied, evaluate at least one of a total number of target orders obtained after order-combining and a sum of numbers of goods types of the target orders obtained, to determine one or more target orders finally generated;

wherein the control device is enabled to: determine all possible order-combining schemes, based on the circumstance where the target order constraint is satisfied, wherein the order-combining schemes comprise combining the original orders to obtain one or more target orders; calculate, for any order-combining scheme, at least one of a score corresponding to the total number of the target orders obtained and a score corresponding to the sum of numbers of goods types of the target orders obtained; and determine, according to the score obtained by calculating, an order-combining scheme that is finally selected;

wherein the control device is enabled further to: when there is at least one empty slot in the console, select, for each empty slot, a target order from unsorted target orders, for distribution to the empty slot.

8. A non-transitory computer-readable storage medium having stored therein computer-executable instructions which, when executed by a processor, implement the method according to claim 1.

9. The method according to claim 1, further comprising: grouping, when a new batch of original orders is obtained, the new batch of original orders according to the order-combining constraint;

for each group of original orders obtained after grouping, searching for, in a target order that has not been sent to the console, whether there is any original order that is capable of being combined with the each group of original orders: if there is no original order that is capable of being combined with a group of original orders in the target order, combining the group of original orders autonomously to obtain one or more target orders; if there are original orders that are capable of being combined with the group of original orders in a target order, decomposing the corresponding target order into original orders before order-combining, and then combining the original orders before order-combining with the group of original orders to obtain one or more target orders.

10. The control device according to claim 6, wherein the order-combining constraint comprises: each original order has at least one of the same priority and the same type.

11. The control device according to claim 10, wherein the control device is further enabled to:

determine the priority of the original orders according to an out-of-warehouse deadline of the original orders; and determine the type of the original orders according to the number of goods corresponding to the original orders.

12. The control device according to claim 6, wherein the target order constraint comprises at least one of the following:

a total number of goods corresponding to any target order is not greater than a preset number threshold, and a total space occupation of goods is not greater than a preset space threshold.

13. The control device according to claim 6, wherein the control device is further enabled to:

determine for each target order in the target orders obtained after order-combining, the number of goods types of the target order according to the goods types corresponding to original orders contained in the target order; and directly add numbers of goods types of the obtained target orders together to obtain a sum of the numbers of the goods types.

* * * * *